United States Patent
Choi

(10) Patent No.: US 7,671,285 B2
(45) Date of Patent: Mar. 2, 2010

(54) DOME SWITCH ASSEMBLY AND MOBILE COMMUNICATION TERMINAL HAVING THE SAME

(75) Inventor: Hong-suk Choi, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 681 days.

(21) Appl. No.: 11/653,937

(22) Filed: Jan. 17, 2007

(65) Prior Publication Data

US 2007/0289858 A1    Dec. 20, 2007

(30) Foreign Application Priority Data

Jun. 20, 2006    (KR) .................... 10-2006-0055392

(51) Int. Cl.
*H01H 9/00*    (2006.01)
*H04B 1/38*    (2006.01)

(52) U.S. Cl. .................... 200/5 A; 200/512; 200/516; 455/90.3

(58) Field of Classification Search .................... 200/5 A, 200/512, 516, 517; 341/20–22, 32–35; 345/156, 345/168, 169; 361/679.09, 679.11–679.16, 361/679.26–679.3, 799, 800, 816, 818; 455/90.3, 455/117, 575.5; 343/402
See application file for complete search history.

(56) References Cited

U.S. PATENT DOCUMENTS

| | | | | |
|---|---|---|---|---|
| 4,539,445 A | * | 9/1985 | Jabben | 200/5 A |
| 5,557,079 A | * | 9/1996 | Jackson et al. | 200/5 A |
| 5,664,667 A | * | 9/1997 | Kenmochi | 200/314 |
| 6,207,912 B1 | * | 3/2001 | Persson | 200/305 |
| 6,469,245 B2 | * | 10/2002 | Son | 174/382 |
| 7,027,036 B2 | * | 4/2006 | Yang | 345/170 |
| 7,200,009 B2 | * | 4/2007 | Narhi et al. | 361/759 |
| 2003/0045246 A1 | * | 3/2003 | Lee et al. | 455/90 |
| 2004/0046701 A1 | * | 3/2004 | Huber et al. | 343/702 |
| 2004/0185924 A1 | * | 9/2004 | Hwang et al. | 455/575.3 |
| 2004/0203529 A1 | * | 10/2004 | Hong et al. | 455/90.3 |
| 2008/0143614 A1 | * | 6/2008 | Park et al. | 343/702 |
| 2009/0033566 A1 | * | 2/2009 | Nakanishi et al. | 343/702 |

FOREIGN PATENT DOCUMENTS

| | | |
|---|---|---|
| JP | 2005-236396 | 9/2005 |
| KR | 1020050010100 | 1/2005 |
| KR | 1020050029895 | 3/2005 |
| KR | 1020050061990 | 6/2005 |

* cited by examiner

*Primary Examiner*—Michael A Friedhofer
(74) *Attorney, Agent, or Firm*—Roylance, Abrams, Berdo & Goodman, LLP

(57) ABSTRACT

A dome switch assembly that can reduce the SAR value and improve radiation performance of a mobile communication terminal and a mobile communication terminal having the same are provided. The ground layer of the dome switch assembly is connected to a hinge by a hinge contact unit. The hinge contact unit extends through a groove formed in the ground layer towards the inside area of the ground layer and is connected to a bottom surface of the groove. The position and length of the connection of the hinge contact unit to the ground layer may be adjusted so that the SAR value can be reduced and radiation performance can be improved.

20 Claims, 4 Drawing Sheets

DOME SWITCH ASSEMBLY AND MOBILE COMMUNICATION TERMINAL HAVING THE SAME

CROSS-REFERENCE TO RELATED APPLICATION

This application claims the benefit under 35 U.S.C. §119 (a) of Korean Patent Application Serial No. 2006-0055392, filed in the Korean Intellectual Property Office on Jun. 20, 2006, the entire disclosure of which is hereby incorporated by reference.

BACKGROUND OF THE INVENTION

1. Field of the Invention

The present invention relates to a mobile communication terminal. More particularly, the present invention relates to a dome switch assembly that can reduce the Specific Absorption Rate (SAR) value and improve radiation emission performance of a mobile communication terminal, and to a mobile communication terminal using the dome switch assembly.

2. Description of the Related Art

When mobile communication terminals are used to communicate with a network, they emit low levels of radio frequency (RF) electromagnetic waves. There are concerns that the emitted RF electromagnetic waves may be harmful to a human body. SAR values are used to gauge the exposure of user to RF electromagnetic values generated by a mobile communication terminal. SAR stands for Specific Absorption Rate, and is a unit of measurement for the amount of RF electromagnetic waves absorbed into a human body when using a mobile communication terminal.

Higher SAR values indicate that more RF electromagnetic waves are being absorbed into a human body. Since the RF electromagnetic waves may have adverse effects on a human body if too many are absorbed, most countries set acceptable maximum SAR values, particularly for the head. Currently, maximum acceptable SAR values are 1.6 W/kg in South Korea, the U.S.A., Australia and Canada, and 2.0 W/kg in Europe and Japan. In South Korea, all mobile communication terminals introduced into the market since December, 2002 include a disclosure of the meaning and value of SAR and its influence on the human body.

SAR values have a close relationship with the near field of RF electromagnetic waves radiated by an antenna of a mobile communication terminal. Therefore, SAR values are related to the transmission power of the mobile communication terminal, the antenna characteristics, the type of device, and similar factors. Thus, to reduce SAR values, conventional methods of using a directional antenna, intercepting RF electromagnetic waves by attaching a separate interception plate, and inserting an electric wave absorber are used.

The method of using a directional antenna to reduce SAR values requires a very complicated structure, however, and is incompatible with the current market trend of reducing the thickness and size of mobile terminals. The methods of using a separate interception plate and inserting an electric wave absorber have different effects depending on the material characteristics and the position where the devices are attached, and the manufacturing processes are also complicated.

To address such problems, as shown in FIGS. 1 and 2, a method of reducing the SAR value of a mobile terminal by connecting a ground layer 36 of a dome switch assembly 30 with a hinge 60 has been used.

Referring to FIGS. 1 and 2, a conventional folding type mobile communication terminal 100 includes a main body 10, a cover 50, and a hinge 60. The main body 10 includes a dome switch assembly 30 provided under a keypad 40. The cover 50 includes a display window 51 provided in a surface facing the upper surface of the main body 10. The hinge 60 connects the ends of the main body 10 and the cover 50 so that the cover 50 may be opened and closed with respect to the main body 10.

The dome switch assembly 30 is provided on an upper surface of a printed circuit board (PCB) 20 located within the main body 10. The dome switch assembly 30 is activated by keys on the keypad 40. The dome switch assembly 30 has a structure in which dome switches 35 and a ground layer 36 are formed on an upper surface of an insulating base film 31. The ground layer 36 is disposed apart from the dome switch 35 on the upper surface of the base film 31. A hinge contact unit 38 extends from an external side surface of the ground layer 36 adjacent to the hinge 60 to contact the hinge 60. The ground layer 36 is grounded with the PCB 20.

Therefore, the ground layer 36 of the dome switch assembly 30 performs the function of an interception plate and an electric wave absorber, so that the SAR value of the mobile terminal can be reduced to some extent without requiring a separate interception plate or electric wave absorber.

Since the hinge contact unit 38 protrudes from the external side surface of the ground layer 36 to contact the hinge 60, the ability to adjust the position and length of the hinge contact unit 38 is limited. Accordingly, there is a limitation on the amount of SAR reduction or radiation emission improvement that can be accomplished by the hinge contact unit 38, and there is a need for an improved dome switch assembly and mobile communication terminal having the same which reduces SAR values and radiation emission.

SUMMARY OF THE INVENTION

An aspect of the present invention is to address at least the above problems and/or disadvantages and to provide at least the advantages described below. Accordingly, an aspect of the present invention is to provide a dome switch assembly and a mobile communication terminal having the same that can reduce SAR values and improve radiation performance by adjusting the position and length where a hinge contact unit connects to a ground layer.

In accordance with an aspect of the present invention, the above and other objects are basically accomplished by a dome switch assembly for a mobile communication terminal having a main body and a cover coupled by a hinge. The dome switch assembly includes a base film, and a plurality of dome switches attached to an upper surface of the base film. A ground layer is formed on the upper surface of the base film (except at the locations of the dome switches). The ground layer has a groove that extends towards the internal area of the ground layer from an external side surface, which is adjacent to the hinge. A hinge contact unit is formed in the base film so that a first end contacts the hinge and a second end opposite to the first end extends into the groove of the ground layer and connects to a bottom surface of the groove. The hinge contact unit is connected to the ground layer within the ground layer.

The dome switch assembly may further include a coating layer covering the dome switches, the ground layer, and the hinge contact unit, except the first end of the hinge contact unit.

The hinge contact unit may be disposed apart from the dome switch formed on the base film.

The ground layer and the hinge contact unit may be integrally formed on an upper surface of the base film. The ground layer and the hinge contact unit may be made of a metal mesh material having good electrical conductivity.

In accordance with another aspect of the present invention, the above and other objects are basically accomplished by a mobile communication terminal having a dome switch assembly. A main body has a dome switch assembly provided under a keypad. A cover is provided on an upper surface of the main body. A hinge connects the main body and the cover so that the cover can be opened and closed with respect to the main body.

The main body may include a PCB, the dome switch assembly, and a keypad. A plurality of key terminals are formed on an upper surface of the PCB. The dome switch assembly is provided on the upper surface of the PCB and the dome switches correspond to the key terminals. The keypad is provided on an upper part of the dome switch assembly and has keys corresponding to the dome switches.

In accordance with yet another aspect of the present invention, the above and other objects are basically accomplished by a dome switch assembly for a mobile communication terminal having a main body and a cover coupled by a hinge. The dome switch assembly comprises a base film, a plurality of dome switches disposed on an upper surface of the base film, a ground layer provided on the upper surface of the base film, the ground layer having contact holes at the locations of the dome switches and a groove extending into the inside of the ground layer, and a hinge contact unit for connecting the ground layer to the hinge of the mobile communication terminal. The hinge contact unit has a first end for contacting the hinge and a second end for extending into and connecting to the groove in the ground layer.

In accordance with still another aspect of the present invention, the above and other objects are basically accomplished by a method of reducing SAR values in a folding type mobile communication device having a main body, a cover, and a hinge. The method comprises the steps of providing a dome switch assembly having a ground layer, the ground layer having an internal area and an area adjacent to the hinge, and connecting the internal area of the ground layer to the hinge.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
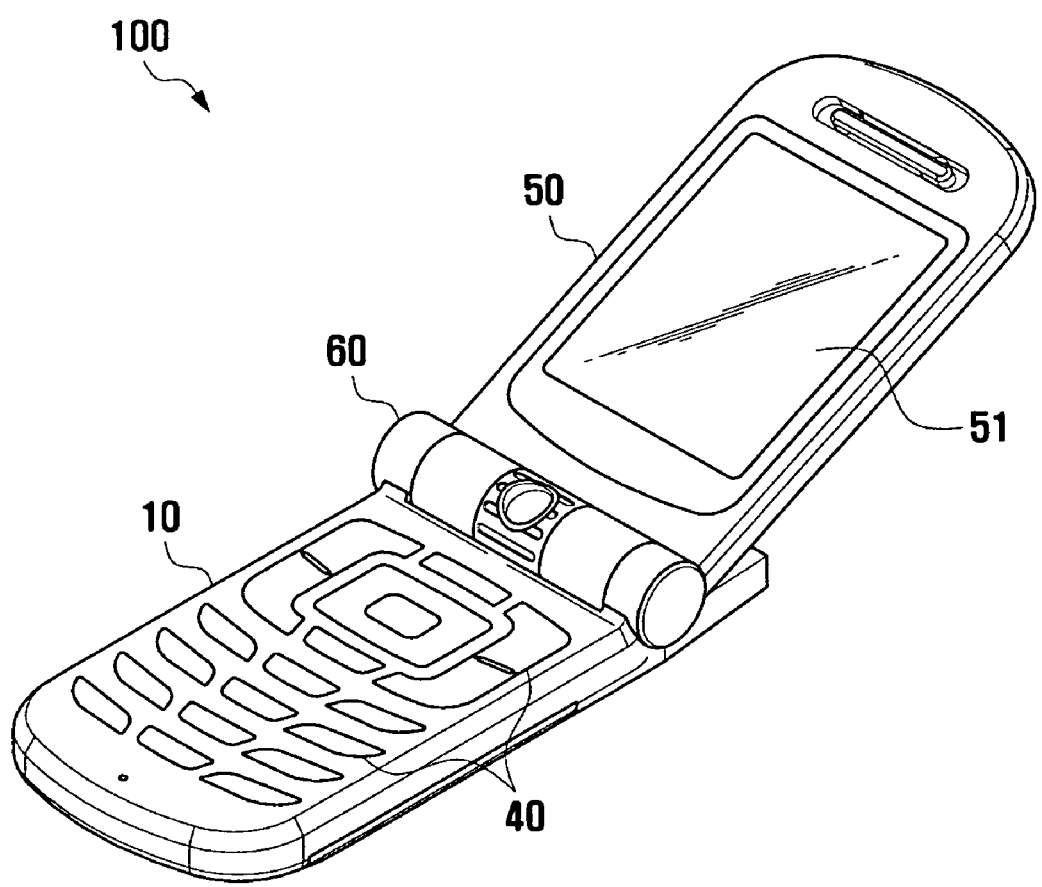
FIG. 1 is a perspective view of a conventional folding type mobile communication terminal.
Figure 2:
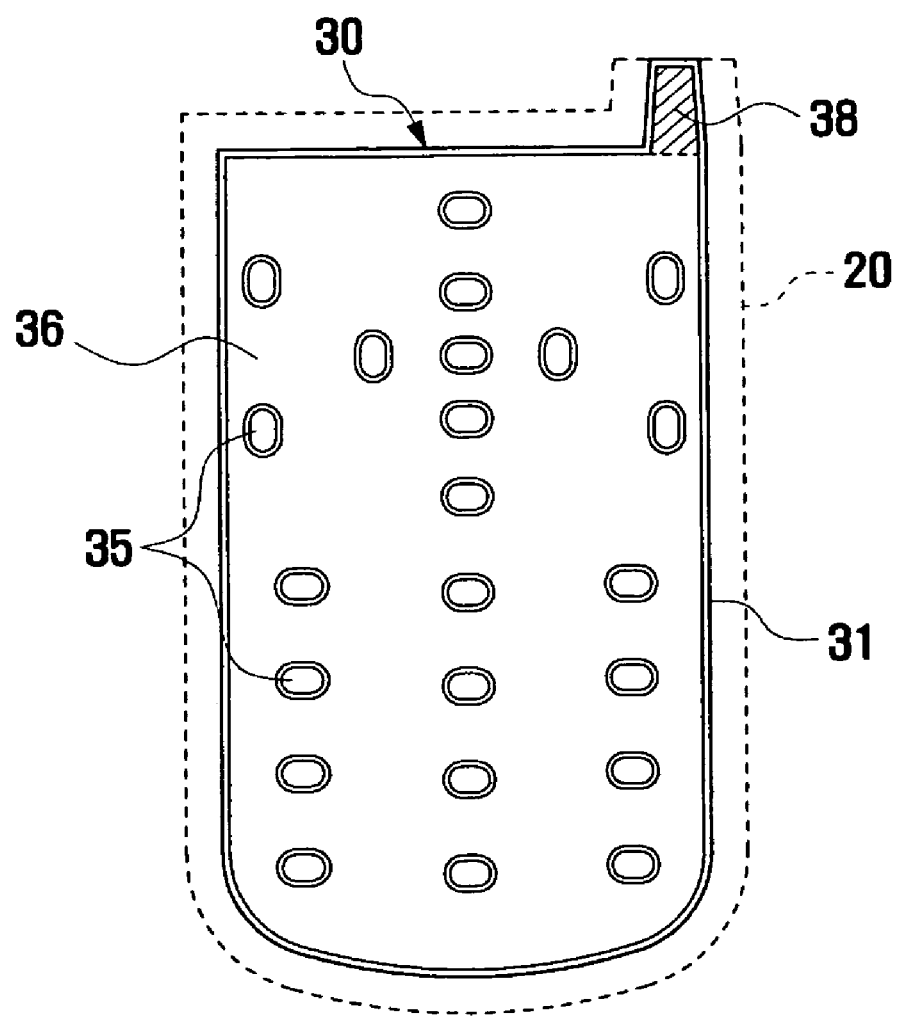
FIG. 2 is a plan view of a dome switch assembly in the mobile communication terminal of FIG. 1.
Figure 3A:
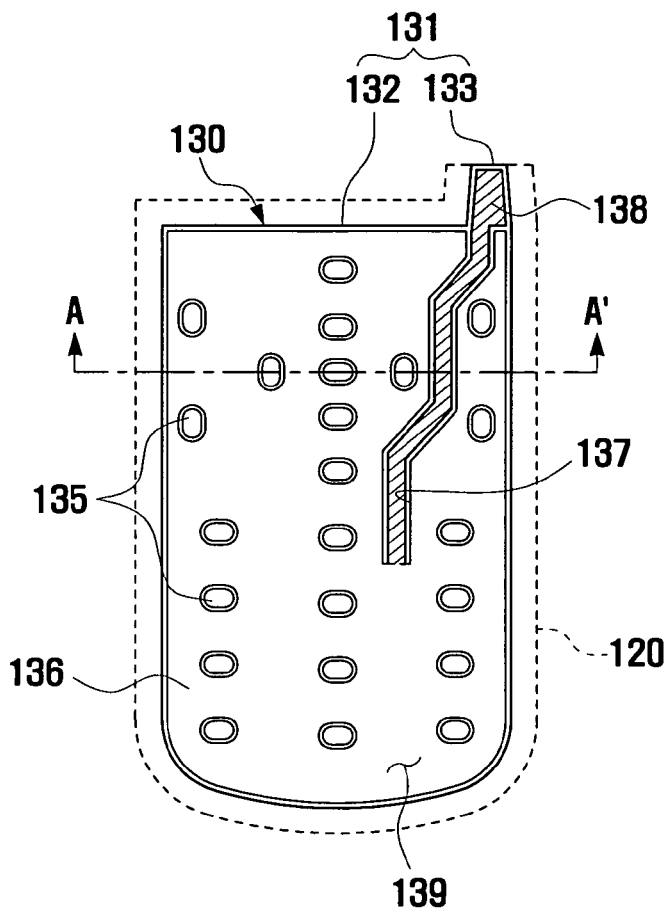
FIG. 3A is a plan view of a dome switch assembly according to an exemplary embodiment of the present invention.
Figure 3B:
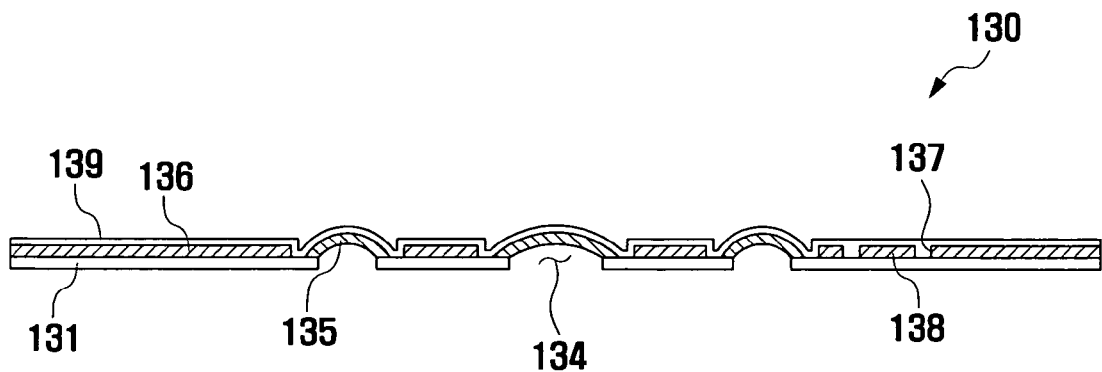
FIG. 3B is a cross-sectional view of the dome switch assembly taken along line A-A' of FIG. 3A.

FIG. 3A is a plan view of a dome switch assembly 130 according to an exemplary embodiment of the present invention, and FIG. 3B is a cross-sectional view of the dome switch assembly taken along line A-A' of FIG. 3A.

Referring to FIGS. 3A and 3B, the dome switch assembly 130 according to an exemplary embodiment of the present invention includes a base film 131, a plurality of dome switches 135, a ground layer 136, a hinge contact unit 138, and a coating layer 139.

The base film 131 has a rectangular shape corresponding to a PCB 120 provided within the main body of the mobile communication terminal and includes a first area 132 and a second area 133. The dome switches 135 are formed in the first area 132. The second area 133 extends from an external side surface of the first area 132 provided adjacent to the hinge. One end of the hinge contact unit 138 is formed in the second area 133. In the illustrated embodiment, the second area 133 extends from a corner of the first area 132. Contact holes 134 are formed in the base film 131 at locations corresponding to the dome switches 135 so that a central part of the dome switches 135 are exposed to a lower surface of the base film 131.

The base film 131 may be made of an insulating synthetic resin, for example, a polyimide resin.

The dome switches 135 are attached to an upper surface of the first area 132. The dome switches 135 cover the contact holes 134. The positions of the dome switches 135 correspond to the keys of a keypad.

The ground layer 136 covers the upper surface of the base film 131 except at the locations of the dome switches 135. Further, a groove 137 is formed in the ground layer 136. The groove extends from an external side surface provided adjacent to the hinge towards the inside of the ground layer.

The hinge contact unit 138 is formed on the upper surface of the base film 131. The hinge contact unit 138 has a first end and a second end opposite to the first end. The first end of the hinge contact unit 138 is formed in the second area 133 for contacting the hinge. The second end extends into the groove 137 in the ground layer 136 and is connected to a bottom surface of the groove 137. The hinge contact unit 138 is separated from the side surfaces of both sides of the groove 137.

A thin insulating coating layer 139 for covering the dome switches 135, the ground layer 136, and the hinge contact unit 138 is formed on the upper surface of the base film 131. The first end of the hinge contact unit 138 that contacts the hinge is not coated by the thin insulating coating layer 139.

The groove 137 of the ground layer 136 does not contact the dome switches 135. To avoid contacting the dome switches 135, the groove 137 of the ground layer 136 can bend—that is, it may include at least one bending portion. The width of the groove 137 of the ground layer 136 may be greater than that of the hinge contact unit 138 to be formed at the inside of the groove 137 and the length of the groove 137 may correspond to that of the hinge contact unit 138. The hinge contact unit 138 may have a different length depending on the kind of mobile communication terminal.

The ground layer 136 and the hinge contact unit 138 may be integrally formed on the upper surface of the base film 131. The ground layer 136 and the hinge contact unit 138 are preferably made of metal having good electrical conductivity. The ground layer 136 and the hinge contact unit 138 may be formed as a thin plate or, preferably, may be formed as a mesh.

As described above, the reduction of the SAR value and improvement of radiation performance are related to the position and length of the connection of the hinge contact unit 138 to the ground layer 136. Therefore, in an exemplary embodiment of the present invention, the hinge contact unit 138 is connected to the ground layer 136 within the ground layer 136. Accordingly, the position and length of connection of the hinge contact unit 138 to the ground layer 136 can be adjusted, so that the SAR value can be reduced and radiation performance can be improved.

A mobile communication terminal 200 having the dome switch assembly 130 according to an exemplary embodiment of the present invention will now be described with reference to FIG. 4.

Figure 4:
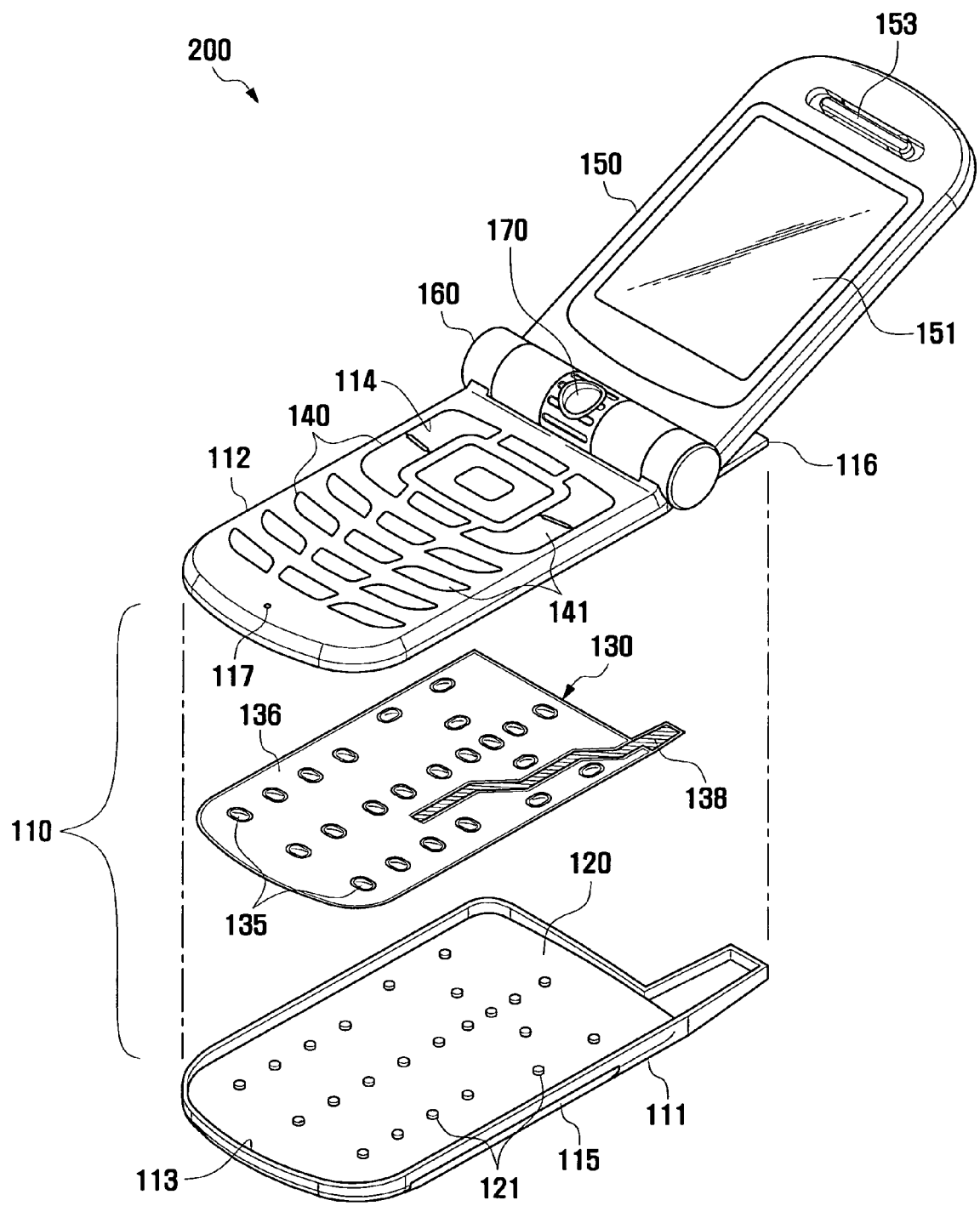
FIG. 4 is an exploded perspective view of a mobile communication terminal having a dome switch assembly according to an exemplary embodiment of the present invention.

Referring to FIG. 4, the mobile communication terminal 200 is a folding type mobile communication terminal which has a main body 110 and a cover 150 that are coupled by a hinge 160.

The main body 110 includes a PCB 120, the dome switch assembly 130, and a keypad 140 that are sequentially provided between a lower case 111 and an upper case 112.

The lower case 111 and the upper case 112 provide a space 113 for accommodating the PCB 120, the dome switch assembly 130, and the keypad 140. A battery pack 115 for supplying power to the mobile communication terminal 200 is provided on a rear surface of the lower case 111. An antenna 116 is provided on one side of the upper case 112.

The PCB 120 includes key terminals 121 on the upper surface of the PCB 120. The key terminals 121 correspond to the locations of the keys of the keypad 140.

The dome switch assembly 130 is provided on the upper surface of the PCB 120. The dome switches 135 correspond to the key terminals 121. The ground layer 136 is grounded with the PCB 120. The hinge contact unit 138 contacts the hinge 160. By disposing the hinge contact unit 138 in a part adjacent to the antenna 116, any increase in the SAR value due to the antenna 116 can be minimized or prevented.

The keypad 140 is provided on the upper part of the dome switch assembly 130 and has keys 141 that correspond to the dome switches 135. Through holes 114 for exposing the keys 141, or for allowing the keys 141 to protrude through, are formed in the upper case 112.

The operation of the mobile communication terminal 200 by the keypad 140 is described as follows.

If a key 141 of the keypad 140 is pressed, the dome switch 135 under the key 141 is pressed down. The dome switch 135 contacts the corresponding key terminal 121 of the PCB 120 through the contact hole (134 of FIG. 3B), thereby generating an electrical signal corresponding to the key 141. If the force pressing the key 141 is removed, the dome switch 135 is restored to its original shape such that the dome switch 135 is separated from the key terminal 121 and the electrical connection is broken. A user can input desired information to the mobile communication terminal 200 or choose desired functions of the mobile communication terminal 200 by operating the keypad 140.

The cover 150 includes a display window 151 provided in a surface of the cover 150 facing the main body 110. The display window 151 displays status information regarding the operation of the mobile communication terminal 200 as an image. A liquid crystal display (LCD) may be used as a display window 151.

A microphone 117 for inputting an audio signal for voice communication is provided under the keypad 140 of the main body 110 and a speaker 153 for outputting an audio signal is provided adjacent to the display window 151 of the cover 150. In the present exemplary embodiment, a camera module 170 for photographing an object is provided in the portion of the mobile terminal in which the hinge 160 is disposed.

Table 1 illustrates the results of testing of the SAR value and radiation performance of a mobile communication terminal formed in accordance with an exemplary embodiment of the present invention. As seen in Table 1, the SAR value is reduced and overall radiation performance is improved as compared to a conventional mobile communication terminal. The overall radiation performance is based on measurements of total radiated power (TRP) and a total isotropic sensitivity (TIS).

TABLE 1

| Test item (unit) | Prior art | Present Exemplary Embodiment |
| --- | --- | --- |
| SAR (mW/g) | 1.6 | 1.4 |
| TRP (dBm) | 16.3 | 20.1 |
| TIS (dBm) | −100.2 | −104 |

In the tests, the mobile communication terminal in accordance with an exemplary embodiment of the present invention had basically the same structure as that of a convention terminal, except for the position that the hinge contact unit was connected to the ground layer. That is, the hinge contact unit was grounded to the ground layer by extending the hinge contact unit to the inside of the ground layer. The tests confirm that this configuration reduced the SAR value and improved radiation performance. The suitable position where the hinge contact unit is connected to the ground layer for a mobile communication terminal may be determined through such tests.

In accordance with the exemplary embodiments of the present invention, by extending the position where the hinge contact unit contacts the ground layer to the inside of the ground layer, the position and length of the connection of the hinge contact unit to the ground layer can be adjusted, so that the SAR value can be reduced and radiation performance can be improved.

While the invention has been shown and described with reference to certain embodiments thereof, it will be understood by those skilled in the art that various changes in form and details may be made therein without departing from the spirit and scope of the invention as defined by the appended claims.

What is claimed is:

1. A dome switch assembly for a mobile communication terminal having a main body and a cover coupled by a hinge, comprising:

a base film;

a plurality of dome switches attached to an upper surface of the base film;

a ground layer formed on the upper surface of the base film except at the locations of the dome switches and a groove extending from an external side surface adjacent to the hinge towards the inside of the ground layer; and a hinge contact unit formed on the base film, the hinge contact unit having a first end contacting the hinge and a second end opposite to the first end extending into the groove of the ground layer and connecting to a bottom surface of the groove.

2. The dome switch assembly of claim 1, further comprising a coating layer covering the dome switches, the ground layer, and the hinge contact unit, except the first end of the hinge contact unit.

3. The dome switch assembly of claim 1, wherein the hinge contact unit is disposed apart from the dome switches.

4. The dome switch assembly of claim 3, wherein the ground layer and the hinge contact unit are integrally formed on an upper surface of the base film.

5. The dome switch assembly of claim 4, wherein the ground layer and the hinge contact unit comprise a metal mesh type material having good electrical conductivity.

6. The dome switch assembly of claim 1, wherein the hinge contact unit is separated from side surfaces at both sides of the groove.

7. The dome switch assembly of claim 1, wherein the groove has at least one bending portion.

8. A mobile communication terminal comprising:
a main body with a dome switch assembly under a keypad;
a cover provided on an upper surface of the main body; and
a hinge connecting the main body and the cover so that the cover may be opened or closed with respect to the main body,
wherein the dome switch assembly comprises:
a base film;
a plurality of dome switches attached to an upper surface of the base film;
a ground layer formed on the upper surface of the base film except at the locations of the dome switches and a groove extending from an external side surface adjacent to the hinge towards the inside of the ground layer; and
a hinge contact unit formed on the base film, the hinge contact unit having a first end contacting the hinge and a second end opposite to the first end extending into the groove of the ground layer and connecting to a bottom surface of the groove.

9. The mobile communication terminal of claim 8, wherein the main body comprises:
a printed circuit board (PCB) with a plurality of key terminals formed on an upper surface thereof, the dome switch assembly being provided on an upper surface of the PCB, the dome switches being formed to correspond to the key terminals; and
a keypad provided on an upper part of the dome switch assembly and having keys corresponding to the dome switches.

10. The mobile communication terminal of claim 9, further comprising a coating layer covering the dome switches, the ground layer, and the hinge contact unit, except the first end of the hinge contact unit.

11. The mobile communication terminal of claim 10, wherein the hinge contact unit is disposed apart from the dome switch.

12. The mobile communication terminal of claim 11, wherein the ground layer and the hinge contact unit are integrally formed on an upper surface of the base film.

13. The mobile communication terminal of claim 12, wherein the ground layer and the hinge contact unit comprise a metal mesh type material having good electrical conductivity.

14. The mobile communication terminal of claim 8, wherein the hinge contact unit is separated from side surfaces at both sides of the groove.

15. The mobile communication terminal of claim 8, wherein the groove has at least one bending portion.

16. A method of reducing SAR values in a folding type mobile communication device having a main body and a cover coupled by a hinge, comprising:
providing a dome switch assembly having a ground layer and a hinge contact unit to the main body, the hinge contact unit having a first end that is formed adjacent to the hinge and a second end that is connected to the inside of the ground layer; and
connecting the internal area of the ground layer to the hinge by contacting the first end of the hinge contact unit to the hinge.

17. The method according to claim 16, further comprising:
forming a groove for connecting the second end of the hinge contact unit to the internal area of the ground layer.

18. The method according to claim 16, wherein the hinge contact unit is a mesh material.

19. The method according to claim 17, wherein the hinge contact unit is connected to the bottom surface of the groove.

20. The method according to claim 17, wherein the hinge contact unit is separated from side surfaces at both sides of the groove.

* * * * *